C. WILLIAMS.
SANDING APPARATUS FOR MOTOR DRIVEN VEHICLES.
APPLICATION FILED JAN. 13, 1916.
1,191,257.
Patented July 18, 1916.
3 SHEETS—SHEET 2.
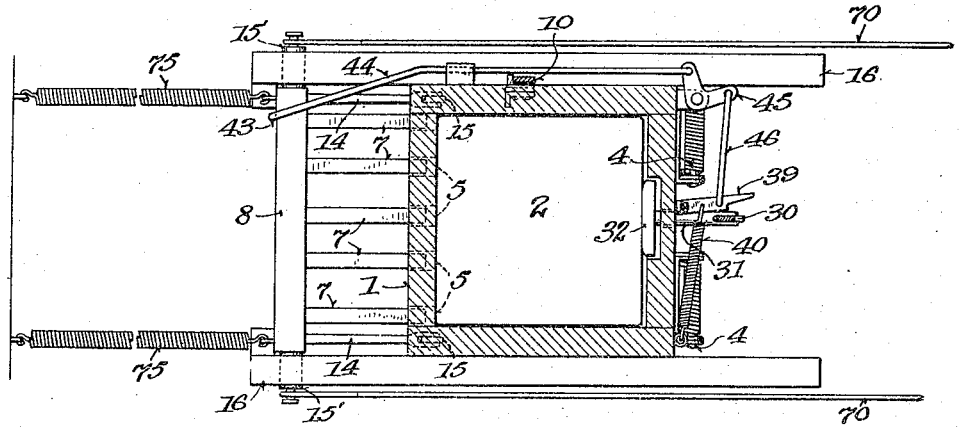
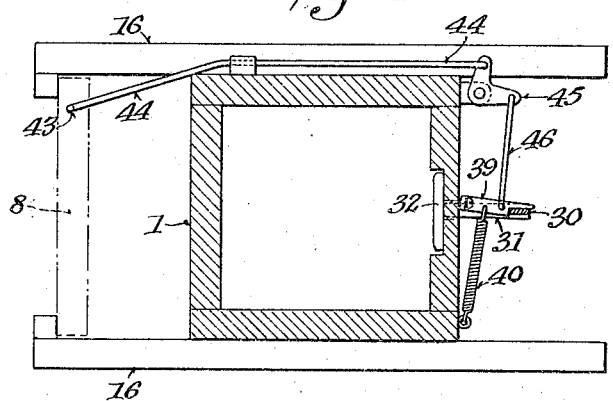

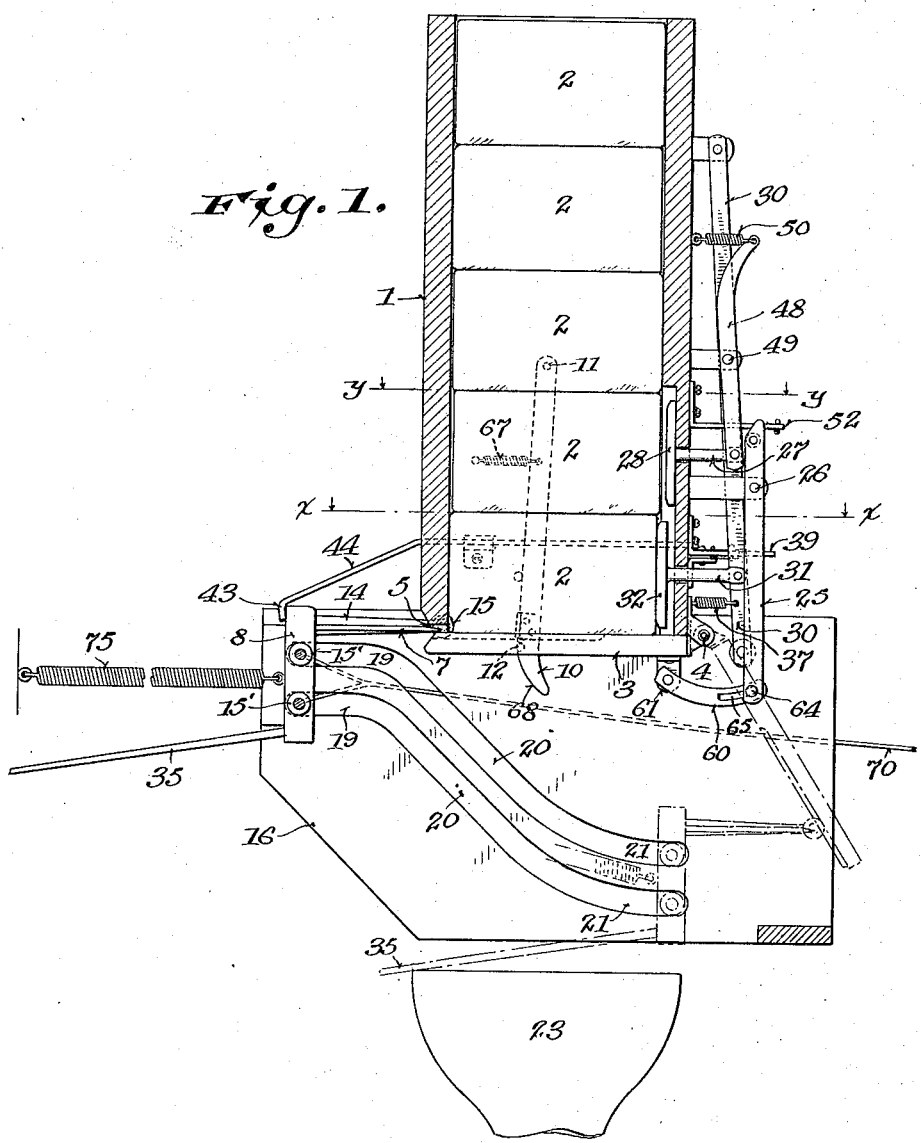

C. WILLIAMS.
SANDING APPARATUS FOR MOTOR DRIVEN VEHICLES.
APPLICATION FILED JAN. 13, 1916.

1,191,257.

Patented July 18, 1916.
3 SHEETS—SHEET 3.

Inventor
Clifton Williams
By Erwin E. Wheeler
Attorneys.

UNITED STATES PATENT OFFICE.

CLIFTON WILLIAMS, OF MILWAUKEE, WISCONSIN.

SANDING APPARATUS FOR MOTOR-DRIVEN VEHICLES.

1,191,257.  Specification of Letters Patent.  Patented July 18, 1916.

Application filed January 13, 1916.  Serial No. 71,825.

*To all whom it may concern:*

Be it known that I, CLIFTON WILLIAMS, a citizen of the United States, residing at Milwaukee, county of Milwaukee, and State of Wisconsin, have invented new and useful Improvements in Sanding Apparatus for Motor-Driven Vehicles, of which the following is a specification.

My invention relates to improvements in sanding apparatus for motor driven vehicles.

The object of my invention is to provide reliable means for delivering a definite quantity of sand upon a slippery surface directly in front of the traction wheels of the motor vehicle, whereby skidding or sliding may be stopped or avoided.

Figure 4:
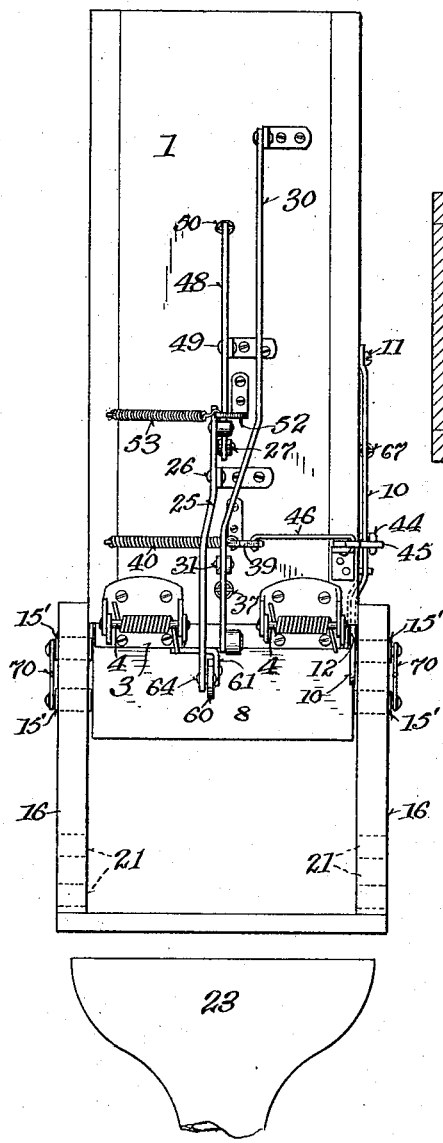
Figure 5:
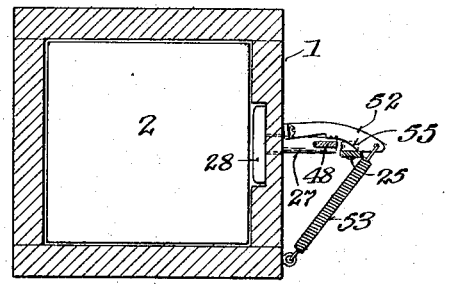
Figure 6:
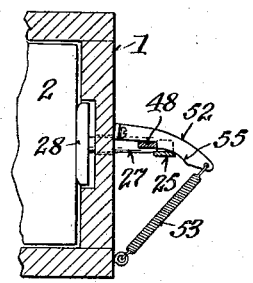

In the drawings Figure 1 is a side elevation of a sanding apparatus embodying my invention. Fig. 2 is a horizontal sectional view, drawn to a plane on line $x$—$x$ of Fig. 1, the operating and controlling connections being omitted, with the exception of the trip latch which locks the lower box holding plunger, and which is shown in released position. Fig. 3 is a fragmentary view, on the same plane, showing the trip latch in locking position. Fig. 4 is a rear elevation. Fig. 5 is a sectional view, drawn to a plane on $y$—$y$ of Fig. 4, with the operating and controlling parts omitted, with the exception of the upper plunger and trip latch, the latter being shown in released position. Fig. 6 is a fragmentary view on the same plane, showing the trip latch in locking position.

Like parts are identified by the same reference characters throughout the several views.

A casing 1, adapted to receive a series of sand boxes 2, is secured in any suitable manner to the floor of the vehicle body. The boxes 2 are formed of paste board or other suitable non-metallic material, which can be easily cut or torn apart to permit the discharge of the sand. These boxes are paraffined or otherwise coated to render them water-proof. The sand is specially prepared by being baked or otherwise treated to expel all moisture in order to prevent it from caking in the boxes, if stored for long periods. The boxes are held in the casing in a vertical series, and the sand is discharged from the bottom by cutting the box open as hereinafter explained. The other boxes are then permitted to descend after the first or lower box has been emptied and discharged from the cabinet.

The bottom 3 of the cabinet is hinged to the rear wall at 4, spring hinges being employed which normally hold the bottom in closed position. A slot 5 in the front wall of the cabinet immediately above the bottom, is adapted to permit a set of knives 7 to be pushed through the slot by their supporting carrier 8, whereby the bottom of the lower box may be wholly or partially severed. The bottom of the box is normally locked in closed position by a latch 10, which is pivoted to the cabinet at 11, and engages a catch pin 12 on the side of the box bottom. But the carrier 8 also supports a set of arms 14 which are provided with rollers 15 on their outer ends adapted to travel in grooves in the bottom 3, and one of these arms, or the roller thereon, is positioned to strike the latch and push it to releasing position after the knives have entered the box and partially severed the bottom thereof.

The carrier 8 has a pair of rollers 15' at each end, which travel in guide channels formed in the frame 16. The front end portions 19 of these guide channels are substantially horizontal, but the middle portions 20 are inclined downwardly, preferably along curved lines, the rear end portions 21 being also substantially horizontal. The carrier will therefore travel rearwardly in a horizontal direction in the initial stages of its rearward movement, and will then move downwardly after the box has been sufficiently cut to permit the discharge of the sand. But the downward movement of the carrier will occur after the latch 10 has been released, and the arms 14 will therefore draw the bottom of the cabinet downwardly, causing it to swing upon its hinges 4, and the knives also carry with them the bottom of the sand box which has been cut away, thus permitting the sand to discharge into a chute 23 which is forked at its lower end and adapted to deliver the sand to the roadway directly in front of the traction wheels. The continued downward and rearward movement of the carrier then causes the hinged bottom 3 to strike and operate a lever 25 which is pivoted to the casing at 26, and the upper end of this lever pushes a plunger 27 inwardly through the wall of the cabinet and actuates a clamping plate 28 to push it against the second sand box from the bottom of the series, thus preventing this box from falling when the bottom box is discharged. The final backwardly swinging movement of the cabinet bottom 3 is communicated to a lever 30, which is pivotally connected with a plunger 31 which normally holds a clamping plate 32 against the lower sand box. The pressure of the bottom 3 on lever 30 causes the latter to swing rearwardly and withdraw the plunger and clamping plate, thus permitting the empty sand box to drop to the street. It is prevented from entering the chute by a set of arms 35, carried by the carrier, and which occupy inclined positions above the chute when the empty box is discharged.

The clamping plate 32 is normally in clamping relation to the box 2, being held in such position by a tension spring 37 connecting lever 30 with the cabinet wall. But when lever 30 is retracted, as above explained, a latch 39 is drawn by a spring 40 into a position to prevent said lever from moving inwardly toward the cabinet under tension of spring 37. Therefore, clamping plate 32 will be locked in the retracted position pending the return movement of the carrier 8. The carrier 8, during its final return movement, retracts latch 39 by engaging a hook 43 on link rod 44, whereupon motion is transmitted to latch 39 through the link rod 44, elbow crank 45, and link 46.

The clamping plate 28 is normally out of clamping relation to the second box of the series within the cabinet, this clamping plate being held in a retracted position by a lever 48 pivoted to the cabinet at 49 and having its upper end connected with the cabinet by a tension spring 50. But when lever 25 is actuated as above explained, to push plunger 27 inwardly, said plunger is locked, with the clamping plate 28 in clamping position, by means of a latch 52, the latter being actuated by a spring 53. This latch has a shoulder adapted to engage lever 48, which is pivoted to the plunger 27 at its lower end. But the latch 52 also has a curved portion 55 which extends across the path of the upper end of lever 25 in such a manner that when lever 25 returns to normal position, it will bear upon the curved portion 55 of the latch and push the latch to releasing position, thereby allowing lever 48 to return to normal position and retract plunger 27 and clamping plate 28. A segmental slotted link 60 has one end pivoted to a projection 61 carried by the cabinet bottom 3 and a pin 64, projecting laterally from the lower end of lever 25, is engaged in the slot 65 of said link. Therefore when the cabinet bottom 3 returns to normal position, its final closing movement will be transmitted to lever 25 to pull the lower end of said lever inwardly, whereupon its upper end will press outwardly against the curved portion 55 of the latch 52 to release said latch. The sand boxes 2 remaining in the cabinet, will thereupon be released and allowed to drop until the bottom box of the series rests upon the cabinet bottom 3. This re-adjustment of the sand boxes will take place immediately following the closing of the cabinet bottom, which will now be held in closed position notwithstanding the impact of the boxes by reason of the reëngagement of the latch 10. The latch 10 is actuated by spring 67 and its lower extremity is provided with a curved surface 68 along which the catch pin 12 travels, while door 3 is closing, and thereby presses the latch backwardly until the pin is received in the latch recess or notch, as shown in Fig. 1.

The cabinet bottom 3 will be fully closed at about the same time that the carrier 8 reaches the horizontal portions 19 of the guide-ways. During the movement of the carrier 8 along these horizontal guide-way portions 19, the carrier will engage hooked extremities 43 of link rod 44 and transmit motion to retract latch 39, as above explained, thereby releasing lever 30 and allowing it to return to normal position under the tension of spring 37. This moves the plunger 31 inwardly and restores clamping plate 32 to clamping position against the second sand box, which will then be in the position formerly occupied by the box which was emptied and discharged from the cabinet, as above explained. All the parts will thereupon be in their original or normal position, except that there will be one less sand box in the cabinet.

It will be observed that all of the movements above described, originate from or are controlled by the carrier 8. This carrier will preferably be actuated by the driver of the car through the medium of flexible connections 70 extending to any convenient point within reach of or controlled by the driver. A pull exerted upon these connections will move the carrier rearwardly and downwardly to the lower extremities of the guide-ways, as indicated by dotted lines in Fig. 1. This movement will be accomplished against the tension of a set of springs 75, which restore the carrier to its normal position as soon as the pull upon the flexible connections 70 is relieved. The cabinet opening and the box cutting or sand discharging operations, are therefore performed under direct pressure exerted by the operator or driver of the car, who can exert whatever power is required for this purpose. This movement also includes the setting of the latches, whereby the clamping plates 32 and 28 are locked out of normal position. The return movement, whereby the cabinet bottom is closed, the clamping plates released in proper order and the carrier 8 restored to its initial position, is entirely automatic. I do not limit the scope of my invention to any specific means for operating the box cutting knives or cabinet opening mechanism, but have merely shown and described one form in which my invention may be embodied. But I attach great importance to the fact that my invention provides means, whereby dry sand may be stored in moisture proof boxes and said boxes emptied successively when conditions require that the roadway be sanded.

I claim—

1. Sanding apparatus for motor vehicles, including the combination with a cabinet adapted to contain a series of sand boxes, of means for opening one of the boxes of the series and simultaneously opening the cabinet underneath said box to permit the discharge of sand from said box, a chute adapted to convey the sand to the roadway in front of the traction wheels of the vehicle, means for discharging the empty box from the cabinet, and means for subsequently closing the cabinet preparatory to the opening of a second sand box.

2. Sanding apparatus for motor driven vehicles, including the combination of a cabinet provided with a hinged bottom and adapted to contain a series of superposed sand containing boxes, a manually actuated movable member provided with means for cutting the bottom from the lower sand box and simultaneously swinging the bottom of the cabinet to open position, clamping means for holding the boxes in the cabinet while the bottom thereof is in open position and pending the discharge of sand from the opened box, means for permitting the empty box to drop from the cabinet without releasing the other boxes, and means for closing the bottom of the cabinet and allowing the remaining boxes to drop to the bottom thereof.

3. Sanding apparatus for motor driven vehicles, including the combination of a cabinet provided with a hinged bottom and adapted to contain a series of superposed sand containing boxes, a manually actuated movable member provided with means for cutting the bottom from the lower sand box and simultaneously swinging the bottom of the cabinet to open position, clamping means for holding the boxes in the cabinet while the bottom thereof is in open position and pending the discharge of sand from the opened box, means for permitting the empty box to drop from the cabinet without releasing the other boxes, and means for closing the bottom of the cabinet and allowing the remaining boxes to drop to the bottom thereof, said cabinet closing means being adapted to control the operation of the clamping devices.

4. Sanding apparatus for motor driven vehicles, including the combination of a cabinet provided with a hinged bottom and adapted to contain a series of superposed sand containing boxes, a manually actuated movable member provided with means for cutting the bottom from the lower sand box and simultaneously swinging the bottom of the cabinet to open position, clamping means for holding the boxes in the cabinet while the bottom thereof is in open position and pending the discharge of sand from the opened box, means for permitting the empty box to drop from the cabinet without releasing the other boxes, and means for closing the bottom of the cabinet and allowing the remaining boxes to drop to the bottom thereof, the operation of said clamping means being controlled from the cabinet bottom to first clamp the second box in the series, then release the open box and subsequently release the second box.

5. Sanding apparatus for motor driven vehicles, including the combination with a cabinet adapted to contain a series of superposed sand boxes and having a hinged bottom, said cabinet being also provided with a slot in one wall thereof adjacent to the bottom, of a carrier provided with knives adapted to enter said slot in a position to cut the bottom from the lower sand box, means for actuating said carrier horizontally during the cutting operation, means for subsequently moving the carrier downwardly to swing the bottom of the cabinet to open position for the discharge of sand from the box cut by the knives, a chute fitted to receive said sand and convey it to the roadway, spring actuated clamping means adapted to hold the lower sand box within the cabinet while the sand is being delivered therefrom, additional clamping means for holding the second box in the series in position pending the closing movement of the bottom of the cabinet, means actuated by the cabinet bottom while swinging to extreme open position, for retracting the first mentioned clamping means and allowing the empty box to drop from the cabinet, means for automatically retracting the carrier and allowing the cabinet bottom to close, and means for readjusting the sand boxes within the cabinet, controlled as to operation by said cabinet bottom and carrier.

6. Sanding apparatus for motor driven vehicles, including the combination with a cabinet adapted to receive a series of superposed sand boxes and having a door at the lower end thereof, spring hinges connecting one margin of said door with the body of the cabinet and adapted to permit the door to swing downwardly against the tension of the springs, clamping devices adapted respectively to engage the two lower boxes in the cabinet, a manually actuated carrier provided with box opening and door opening devices, means, controlled by the carrier, for operating the box for clamping devices, latch mechanism for temporarily locking the clamping devices out of normal position, spring controlled means for restoring said clamping devices to normal position when released by the latch mechanism, and means, controlled by the carrier, for releasing the latch mechanism successively.

7. Sanding apparatus for motor driven vehicles, comprising the combination with a cabinet adapted to receive a series of sand containers, and manually controlled means for successively discharging the contents of said containers.

8. Sanding apparatus for motor driven vehicles, comprising the combination with a cabinet adapted to receive a series of sand containers, and manually controlled means for successively discharging the contents of said containers and subsequently discharging the empty containers in the intervals following the discharge of the contents thereof.

9. Sanding apparatus for motor driven vehicles, including the combination with means for supporting a series of water proof sand boxes from the vehicle, of means for opening said boxes successively, and means for guiding sand from such boxes to the street in front of the traction wheels of the vehicle.

In testimony whereof I affix my signature in the presence of two witnesses.

CLIFTON WILLIAMS.

Witnesses:
LEVERETT C. WHEELER,
IRMA D. BREMER.

Copies of this patent may be obtained for five cents each, by addressing the "Commissioner of Patents, Washington, D. C."